March 9, 1937. W. KÖGEL ET AL 2,072,987

REFRIGERATION

Filed Jan. 25, 1934

INVENTORS,
BY
ATTORNEY.

Patented Mar. 9, 1937

2,072,987

UNITED STATES PATENT OFFICE 2,072,987

REFRIGERATION

Wilhelm Kögel and Nils Widell, Stockholm, Sweden, assignors, by mesne assignments, to Servel, Inc., Dover, Del., a corporation of Delaware Application January 25, 1934, Serial No. 708,172
In Germany February 11, 1933

5 Claims. (Cl. 62—119.5)

Our invention relates to refrigeration, and more particularly to refrigerators of the type employing an auxiliary fluid such as an inert gas into which refrigerant evaporates and which serves to partially or wholly equalize pressure within the system.

The object of the invention is to improve the operation of the low temperature parts of the refrigerating system.

Figure 2:
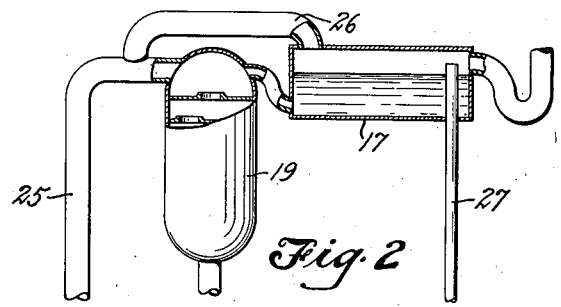
Figure 1:
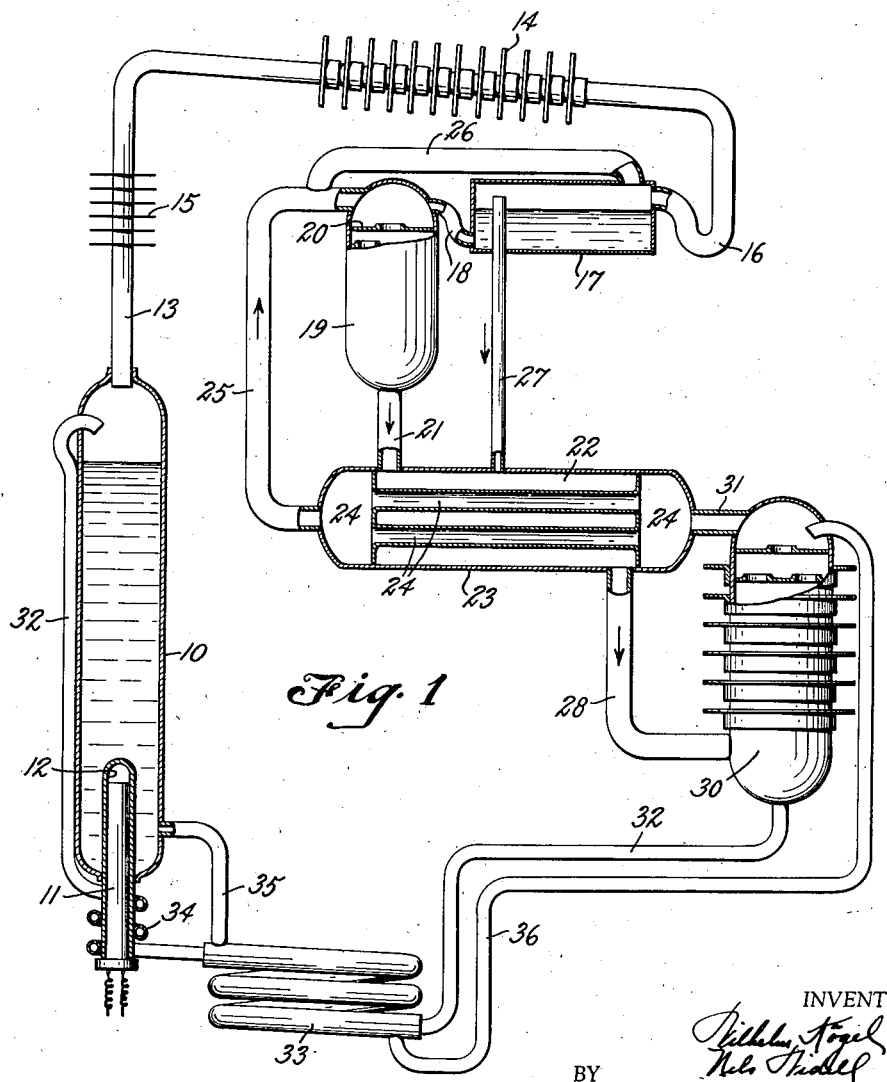

The nature of the invention will be apparent from consideration of the following description taken in connection with the accompanying drawing forming a part of this specification and of which:

Fig. 1 is a more or less diagrammatic showing of a refrigerating system embodying the invention; and Fig. 2 shows a modification.

The system shown in Fig. 1 includes a generator 10 containing refrigerant dissolved in an absorption liquid. The refrigerant may, for example, but without limitation, be ammonia and the absorption liquid may be water. The generator may be heated by any suitable means as by an electric cartridge 11 inserted in a pocket 12. Connected to the upper part of the generator is a vapor conduit 13 for conducting refrigerant vapor to a condenser 14. A rectifier 15 may be interposed in conduit 13. The conduit is connected through a liquid seal 16 with a first evaporator section 17 which may consist of a horizontally disposed cylindrical shell. A conduit 18 connects the lower part of the evaporator section 17 with a second evaporator section 19. The latter evaporator section may, as shown, consist of a cylindrical shell disposed on a vertical axis and containing liquid distributing discs 20.

A conduit 21 connects the bottom of evaporator section 19 with one gas space 22 of a gas heat exchanger 23. The heat exchanger 23 includes another gas space 24 separated from the first gas space 22. A conduit 25 connects gas space 24 with the upper part of evaporator section 19. A branch conduit 26 connects conduit 25 with the upper part of the first evaporator section 17. A conduit 27 connects the upper part of evaporator section 17 with the space 22 of the gas heat exchanger.

A conduit 28 connects the space 22 with the bottom part of an absorber 30. The absorber 30 may be of the same construction as the evaporator section 19. A conduit 31 connects the upper part of the absorber with the space 24 of the gas heat exchanger. A conduit 32 is connected to the bottom of the absorber 30 and extends within a conduit 33 forming a liquid heat exchanger and is thence coiled around the pocket 12 at 34 to form a thermosyphon lift member, and thence extends upwardly to the upper part of the generator. The lower part of the generator is connected by means of a conduit 35 with the conduit 33 and a conduit 36 is connected to conduit 33 and the upper part of the absorber. In addition to the foregoing fluids the system contains inert gas such as hydrogen.

In operation, heat is applied to the generator and drives refrigerant vapor from solution. The refrigerant vapor passes upwardly through conduit 13 and entrained water vapor is condensed out in the rectifier 15 and flows back to the generator. The vaporous refrigerant is condensed in the condenser which may be cooled in any suitable way, as by air cooling, and the liquid refrigerant flows into the evaporator section 17. Liquid refrigerant flows from evaporator section 17 through conduit 18 into the upper part of the evaporator 19. Hydrogen gas, weak in ammonia admixture, flows from the top of the absorber 30 through the conduit 31, through the space 24 of the gas heat exchanger and through conduit 25 into the evaporator section 19. Some of the hydrogen branches off through conduit 26 and enters the evaporator section 17 at a point adjacent the liquid inlet. In both the evaporators, liquid refrigerant evaporates by diffusing into the inert gas. Thus a relatively heavy gas mixture of ammonia and hydrogen is formed in each of the evaporator sections and passes through the conduits 21 and 27 into the space 22 of the gas heat exchanger. The gas mixture passes from this space 22 through conduit 28 into the lower part of the absorber and flows upwardly in the absorber.

Absorption liquid is supplied to the absorber through conduit 36 and trickles downwardly over the trays therein and absorbs the ammonia out of the gas mixture. Circulation is produced upwardly in conduit 25 and downwardly through conduits 21, 27 and 28 due to the fact that the mixture of ammonia and hydrogen produced in the evaporators is heavier than the gas leaving the top of the absorber. Circulation takes place automatically without moving parts in accordance with the principle disclosed in U. S. Patent No. 1,609,334.

Circulation is produced between the generator and the absorber as follows:

The thermosyphon lift element 34 lifts strong solution up to the generator and builds up a head of liquid in the generator which causes flow by gravity of absorption liquid through conduits 35, 33 and 36 into the upper part of the absorber. The thermosyphon element is supplied with liquid through the pipe 32. The warm absorption liquid leaving the generator exchanges heat with the colder absorption liquid flowing toward the generator in the heat exchanger formed by pipes 32 and 33.

The evaporator section 19 may in the alternative consist of a pipe coil. This section serves for the freezing of ice. Suitable structure is provided to hold ice trays. The evaporator 17 may also be disposed within the space to be cooled and may constitute a high temperature evaporator and be equipped with extended surface to transmit cold to the air of the refrigerator compartment. Evaporator 17 acts as a precooler for liquid refrigerant supplied to evaporator section 19. It is not necessary, however, that section 17 be disposed within the space to be cooled.

It has previously been proposed in systems of the kind herein referred to, to pass the inert gas leaving the main evaporator over the liquefied refrigerant passing from the condenser to the evaporator. This has provided an increase in efficiency. However, the efficiency is still further increased if in accordance with the present invention a part of the weak or poor gas leaving the absorber is directly conducted to the liquefied refrigerant before its entrance into the main evaporator. The present invention in effect provides two evaporators which are both supplied with weak gas, and serves to cool the liquid refrigerant flowing to the main evaporator to a very low temperature.

In the arrangement shown in Fig. 2 like reference characters designate corresponding parts. The principal difference is that the gas passes in counter-current to the liquid in the evaporator section 17 whereas in the arrangement shown in Fig. 1 this flow is in parallel. Better efficiency is obtained by the counter-flow than by the parallel flow.

It will be obvious that the invention can be embodied in a number of different forms of apparatus.

What we claim is:

1. Refrigeration apparatus employing refrigerant fluid and auxiliary pressure equalizing fluid and including an absorber, an evaporator, a gas heat exchanger, a second evaporator, conduits connecting said parts and constructed and arranged so that said inert gas is conducted from said absorber through said gas heat exchanger and thence to said evaporators in parallel, and gas is conducted from both of said evaporators to said gas heat exchanger and thence to said absorber, and means for conducting liquid refrigerant fluid in series first through said second evaporator and then through said first evaporator.

2. Refrigeration apparatus employing refrigerant fluid and auxiliary pressure equalizing fluid and including a plurality of separate evaporators adapted to operate at different temperatures, an absorber, means for conducting liquid refrigerant fluid in series first through one of said evaporators and then through another of said evaporators, means for conducting auxiliary inert fluid to said evaporators in parallel, and means for conducting gaseous fluid from said evaporators in parallel streams, uniting the parallel streams of gaseous fluid into a single stream, and conducting the single stream of gaseous fluid to said absorber.

3. The improvement in refrigerating with a system employing refrigerant fluid and auxiliary pressure equalizing fluid which consists in flowing auxiliary fluid in a circuit first in separate parallel paths and then in one part of a common enclosure having separate parts thereof in mutual heat exchange relation, conducting liquid refrigerant fluid into the presence of said inert gas first in one of said parallel paths and then in another of said parallel paths, and flowing inert gas from said first part of the common enclosure to a place of absorption and thence to another part of said common enclosure.

4. In an absorption refrigeration system including a plurality of evaporation members and an absorber, the improvement which consists in flowing liquid refrigerant through said members in series, flowing inert gas first in separate parallel paths each including one of said members, then in one part of a common enclosure having separate parts thereof in mutual thermal exchange relation, then to said absorber, then to the other part of said common enclosure, and then back to the separate parallel paths.

5. In a refrigeration system including a plurality of separate evaporation members adapted to operate at different temperatures and an absorption member, means to conduct liquid refrigerant through said evaporation members in series, and means to conduct an auxiliary agent through said evaporation members in separate parallel paths and then to said absorption member in a single common path.

WILHELM KÖGEL.
NILS WIDELL.